United States Patent

Fodrea

[15] 3,703,031
[45] Nov. 21, 1972

[54] METHOD OF MANUFACTURING AND ASSEMBLING TRANSMISSION COMPONENTS

[72] Inventor: James W. Fodrea, Troy, Mich.

[73] Assignee: General Motors Corporation, Detroit, Mich.

[22] Filed: March 15, 1971

[21] Appl. No.: 124,394

Related U.S. Application Data

[62] Division of Ser. No. 875,271, Nov. 10, 1969, Pat. No. 3,645,147.

[52] U.S. Cl. ..................29/469, 29/428, 74/333, 74/343

[51] Int. Cl. .............................................B23p 21/00

[58] Field of Search ..29/469, 428, 400; 74/333, 343, 74/331

[56] References Cited

UNITED STATES PATENTS

| | | |
|---|---|---|
| 3,318,167 | 5/1967 | Frost ............................74/331 |
| 3,269,203 | 8/1966 | Frost ............................74/333 |
| 3,192,788 | 7/1965 | Fodrea .........................74/333 |
| 3,088,336 | 5/1963 | Fodrea .........................74/333 |

Primary Examiner—John F. Campbell
Assistant Examiner—Donald P. Rooney
Attorney—Warren E. Finken, A. M. Heiter and John P. Moran

[57] ABSTRACT

A transmission including a die cast transmission housing which is readily convertible for use with three-, four-, or five-speed, sliding gear, fully synchronized transmission assemblies, which assemblies may be accomplished on the motor vehicle, thereby eliminating the need for separate transmission assembly facilities, and, when used as a five-speed transmission, including a novel first and reverse duplex gear arrangement in the rear extension housing.

6 Claims, 11 Drawing Figures

INVENTOR.
James W. Fodrea
BY
John P. Moran
ATTORNEY

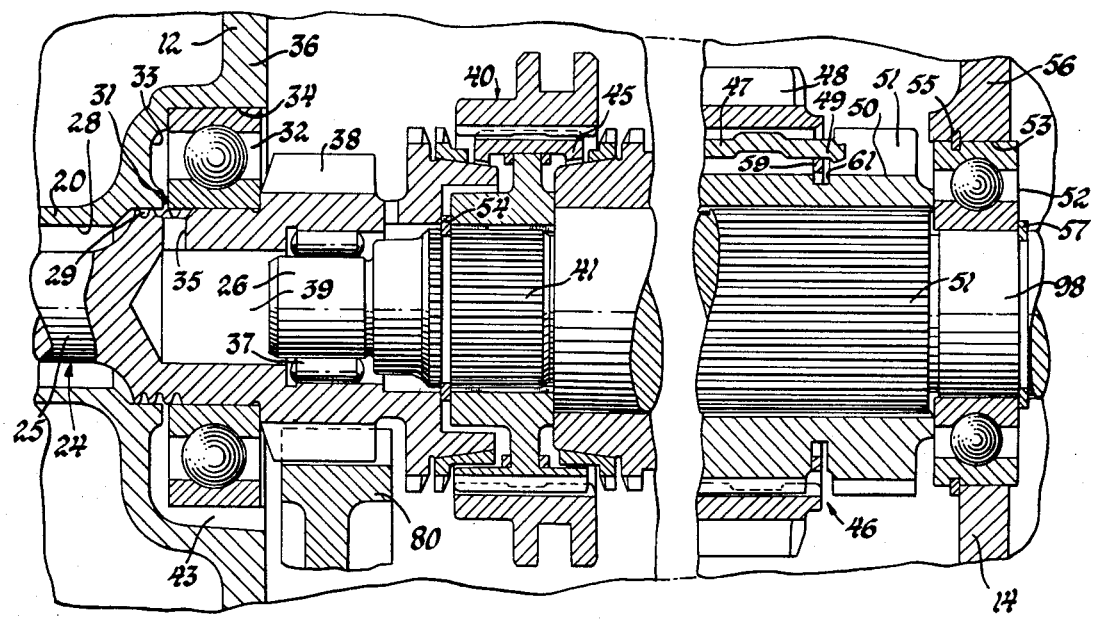
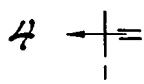
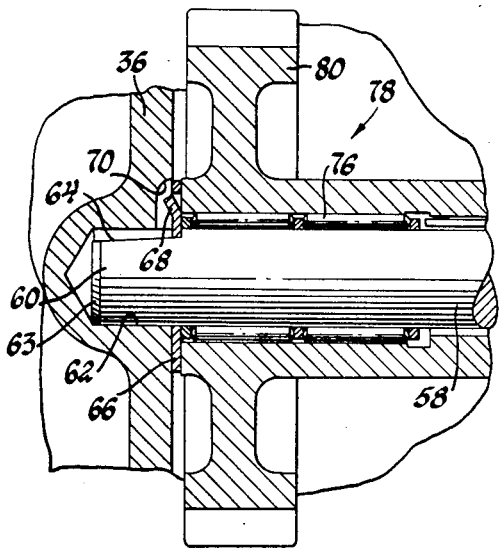
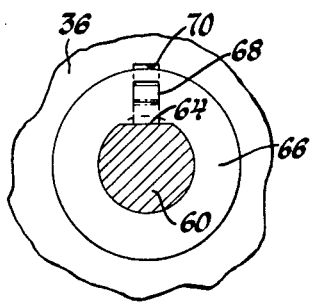
Fig. 2
Fig. 3
Fig. 4
INVENTOR.
James W. Fodrea
BY
John P. Moran
ATTORNEY INVENTOR.
James W. Fodrea
BY
John P. Moran
ATTORNEY INVENTOR.
James W. Fodrea
BY
John P. Moran
ATTORNEY

METHOD OF MANUFACTURING AND ASSEMBLING TRANSMISSION COMPONENTS

This is a division of Ser. No. 875,271, filed Nov. 10, 1969, now U. S. Pat. No. 3,645,147. This invention relates to transmissions and, more particularly, to sliding gear, fully synchronized, multispeed and reverse transmissions.

This transmission provides die cast aluminum clutch housing, transmission case and extension housing, wherein the rear portion of the clutch housing serves as the forward wall of the transmission case and the rear portion of the latter serves as the forward wall of the extension housing. The rear portions of the clutch housing and transmission case are formed such that they cooperate with open forward ends of the transmission case and the extension housing, respectively, to permit the assembly of the transmission on the vehicle, without having to completely assemble a transmission prior to final assembly on a motor vehicle. In other words, predetermined openings formed in the rear portions of the clutch housing permit the assembly of the countershaft and its cluster of gears and the mainshaft and several of its gears on the clutch housing prior to the mounting thereon of the transmission case. Openings formed on the rear portion of the latter then support the free ends of the two shafts prior to the mounting of the reverse idler gear and the shaft and any additional gears on the mainshaft extension. This is followed by the mounting of the extension housing thereon.

Additionally, the transmission case and extension housing are formed such that they are adaptable for use with three-speed transmission components, or may be altered slightly to be suitable for either four-speed or five-speed transmission components, incorporated therein in a novel arrangement.

Accordingly, an object of the invention is to provide improved means for assembling a transmission on a motor vehicle.

Another object of the invention is to provide a transmission which may be readily converted from a three-speed arrangement into either a four-speed or five-speed arrangement.

A further object of the invention is to provide a five-speed transmission wherein the first ratio input gear is formed on an extension shaft mounted in the extension housing on the end of the countershaft, and a cooperating first and reverse duplex gear is mounted on the mainshaft extension in the extension housing.

Still another object of the invention is to provide an improved die cast clutch housing wherein the clutch gear bearing retainer is cast as a part thereof.

A still further object of the invention is to provide an improved thrust bearing arrangement for transmission mainshafts.

A still further object of the invention is to provide an improved transmission countershaft arrangement.

These and other objects and advantages of the invention will become more apparent when reference is made to the following description and accompanying drawings, wherein:

FIGS. 2 and 3 are enlarged cross-sectional views of portions of FIG. 1;

FIG. 4 is a cross-sectional view taken along the plane of line 4—4 of FIG. 3, as if FIG. 3 were a full round view, and looking in the direction of the arrows;

FIGS. 9 and 11 are fragmentary cross-sectional views of two embodiments of a five-speed transmission embodying the invention.

THREE-SPEED TRANSMISSION

Figure 1:
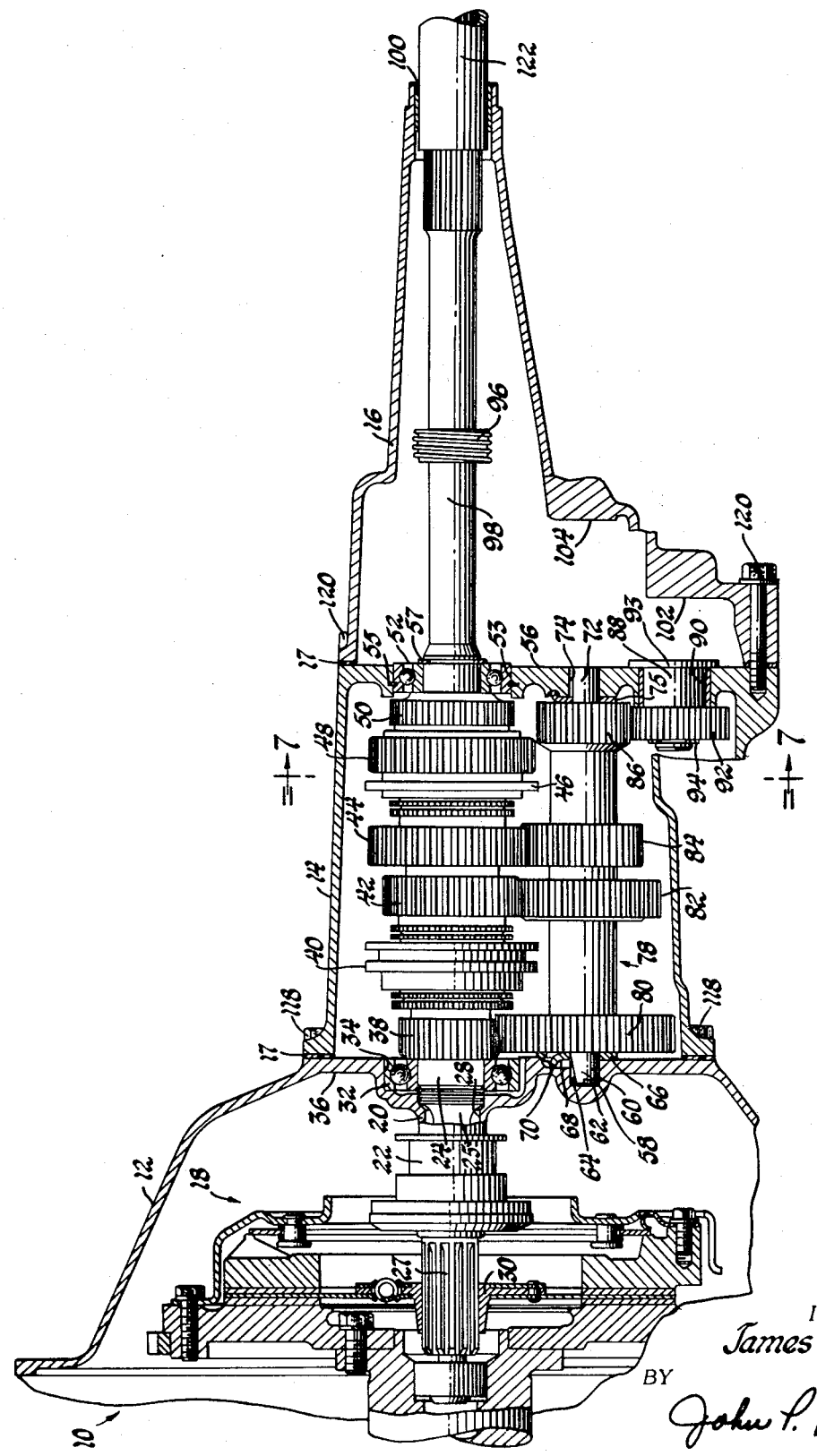
FIG. 1 is a cross-sectional view of a three-speed transmission embodying the invention.

Referring now to the drawings in greater detail, the three-speed transmission 10 of FIG. 1 includes a forward-mounted die cast aluminum clutch housing 12, a centrally-mounted die cast aluminum transmission case 14 and a rear-mounted die cast aluminum extension housing 16 separated by gaskets 17.

Included in the clutch housing 12 is a clutch mechanism 18 which is fully illustrated and described in U.S. Pat. No. 2,770,341 which issued on Nov. 13, 1956 in the name of Marvin T. Wobrock, and will not hereinafter be described. However, it should be noted that the clutch housing 12 is die cast to include a cylindrical throwout bearing support sleeve 20 suitable for supporting the usual clutch throwout bearing 22. A mainshaft 24, comprising interrelated front and rear shaft portions 25 and 26 (FIG. 2), respectively, includes splines 27 formed on the forward end 25 thereof which extends through the opening 28 formed by the cylindrical throwout bearing support sleeve 20 and engages the usual splined sleeve 30 of the clutch mechanism 18. Bearings 32, mounted in a recess 34 formed in the rear wall 36 of the clutch housing 12, support the front portion 25 of the mainshaft 24, and needle bearings 37 (FIG. 2) are mounted in a counter-bored opening 39 formed in the rearward end of the shaft portion 25 for the insertion of the forward end of the shaft portion 26. The bearings 32 are lubricated by splash from the walls of the transmission. A threaded portion 29 formed on the shaft 25 adjacent an oil passage 31 serves as a hydrodynamic seal to prevent leakage from the housing 14. An annular groove 33 formed at the forward end of the recess 34 communicates with a drain passage 43 formed in the recess 34 beneath the bearings 32. A vent or breathe hole 35 is formed through the wall of the shaft 25, communicating between the central opening 39 and the threaded portion 29.

Mounted on the mainshaft 24 in the transmission case 14 are an input gear 38 on the mainshaft front portion 25, a second-third synchronizing device 40 including the usual synchronizer plate 45 on splines 41 (FIG. 2) formed on the mainshaft rear portion 26, and, also on the mainshaft rear portion 26, a second ratio output gear 42, a first ratio output gear 44, a first ratio synchronizing device 46 including a synchronizer plate 47, a reverse output gear 48 and a splined hub 50, the latter being mounted on splines 51 (FIG. 2) formed on the mainshaft rear portion 26 and supporting the first ratio synchronizing device 46. A key 49, formed on the plate 47, extends into a milled slot 51 formed in the hub 50 to retain a ring member 59 in an annular groove 61 in the hub 50 adjacent the gear 48.

Bearings 52, mounted in an opening 53 formed in the rear wall 56 of the transmission case 14, support the rear portion 26 of the mainshaft 24. The members 40, 42, 44, 46, 48, 50, and 52 have heretofore been held in place by retaining rings 54 (FIG. 1), 55 and 57 (FIGS. 1 and 2), the rings 54 and 57 being secured to the rear shaft 26 and the ring 55 being secured to the transmission case 14, but may be secured in an improved manner as will be hereinafter described.

A countershaft 58 (FIG. 3) is supported at its forward end 60 in a pocket or opening 62 formed in the rear wall 36 of the clutch housing 12. A chamfer 63 is formed on each end of the countershaft 58 to serve to pilot the shaft 58 into the openings 62 and 74 (FIG. 1). A tapered flat 64, better seen in FIG. 3, is formed on the forward end 60, and a retainer 66 is mounted around the end 60 on the tapered flat 64 and retained in position either in a notch formed at the higher end (FIG. 3) of the tapered flat 64 or by staking. A projection 68 formed on the retainer 66 extends into a recess or slot 70 formed in the rear wall 36 of the clutch housing 12 and prevents the countershaft 58 from rotating. The other end 72 of the countershaft 58 is mounted in the opening 74 formed in the rear wall 56 of the transmission case 14 and may include a retainer 75 similar to retainer 66. Needle bearings 76 (FIG. 3) mounted on the countershaft 58 at both ends thereof serve to rotatably support a gear cluster 78 which includes a drive gear 80, a second ratio input gear 82 (FIG. 1), a first ratio input gear 84, and a rear countergear 86, the bearings 76 and the gears 80, 82, 84, and 86 being held together by the retainers 66 and 75.

A reverse idler shaft 88 is mounted in a third opening 90 formed in the rear wall 56 of the transmission case 14. The shaft 88 rotatably supports a reverse idler gear 92 which meshes with the rear countergear 86. The shaft 88 is retained in position by a flange 93 abutting against the outside surface of the wall 56 and a retainer ring 94 adjacent the forward face of the reverse idler gear 92.

A speedometer drive gear 96 is mounted on the extension 98 of the mainshaft 24 in the extension housing 16. Bearings 100 support the mainshaft extension 98 at the rear of the extension housing 16. Bosses 102 and 104 are formed on an inside surface of the extension housing 16 for a purpose to be described. The boss 102 is aligned with the axis of the reverse idler shaft 88, and the boss 104 is aligned with the axis of the countershaft 58.

Figure 7:
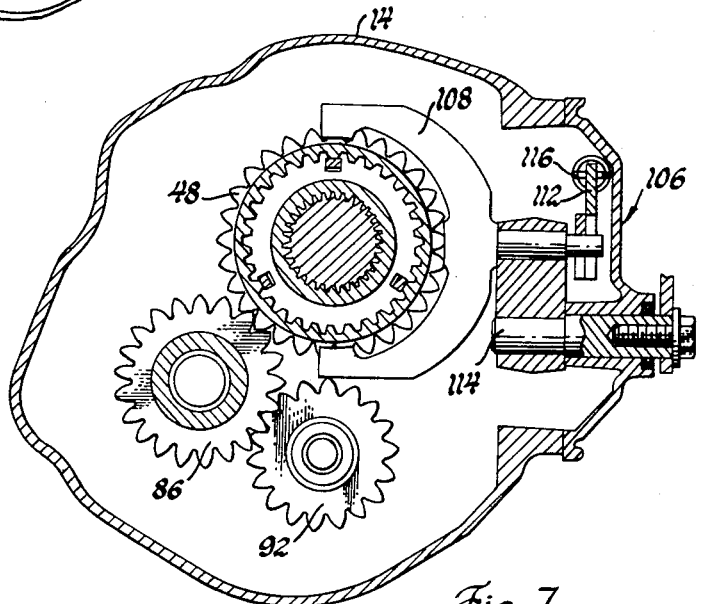
FIG. 7 is a cross-sectional view taken along the plane of line 7—7 of FIG. 1, and looking in the direction of the arrows.
Figure 8:
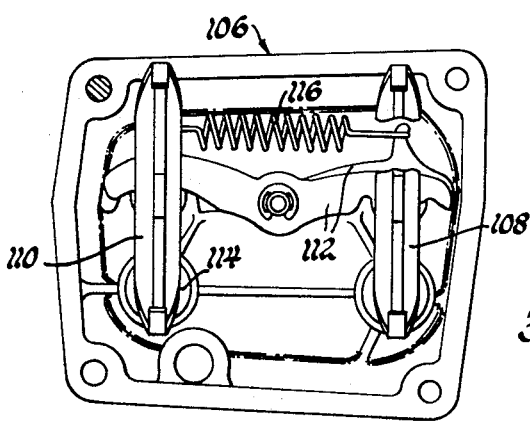
FIG. 8 is an inside view of the side cover assembly shown in FIG. 7.

A side cover assembly 106 (FIGS. 7 and 8) includes the reverse-first shift fork 108 and the second-third shift fork 110 (FIG. 8) and may include interlock levers 112, shift shafts 114 and a spring 116 similar to those fully illustrated and described in U.S. Pat. No. 3,264,894, issued on Aug. 9, 1966 in the names of G. Popovich et al.

METHOD OF ASSEMBLY

Using the above-described components, the three-speed transmission is assembled in the following steps:

A. The synchronizing devices 40 and 46 and the gears 38, 42, 44, and 48, along with the splined hub 50, are assembled in the order illustrated in FIG. 1 on the mainshaft 24. The gear cluster 78, including countershaft gears 80, 82, 84, and 86, along with the retainer 66, is mounted on the countershaft 58. The countershaft gears 80, 82, 84 and 86 are then placed in mesh with their cooperating gears, mainshaft gears 38, 42, 44, and 48, respectively. The splined end portions 27 of the mainshaft 24 is then inserted through the opening 28 until the splines 27 mesh with the splined sleeve 30. At this point, the forward end 60 of the countershaft 58 will have been aligned with and inserted into the pocket 62 in the rear wall 36 of the clutch housing 12. The mainshaft and countershaft assemblies will remain suspended in this position, extending from the rear wall 36 of the clutch housing 12.

B. The forward gasket 17 and the transmission case 14, which has the reverse idler shaft 88 and the gear 92 mounted in the opening 90 thereof, are then mounted over the mainshaft and countershaft assemblies, abutted against the rear wall 36 of the clutch housing 12 and aligned and secured thereto by body-fitting ⅜-inch washer head bolts 118. Openings 53 and 74, formed in the rear wall 56 of the transmission case 14, will have received the extension 98 of the mainshaft 24 and the end 72 of the countershaft 58, the extension 98 being supported in the wall 56 by bearings 52.

C. The speedometer drive gear 96 is then mounted on the extension 98 of the mainshaft 24.

D. The rear gasket 17 and the extension housing 16 are then mounted around the extension shaft 98, abutted against the rear wall 56 of the transmission case 14, and secured thereto by ⅜-inch washer head bolts 120. The exterior rearward end 122 of the extension shaft 98 is supported by the bearings 100 at the rear of the extension housing 16.

E. The side cover assembly 106 is then mounted on the transmission case 14, with the internal R–1 and 2–3 shift forks 108 and 110 thereof aligned in a neutral position for engagement with the first and 2–3 synchronizing devices 46 and 40, respectively.

FOUR-SPEED TRANSMISSION

Figure 5:
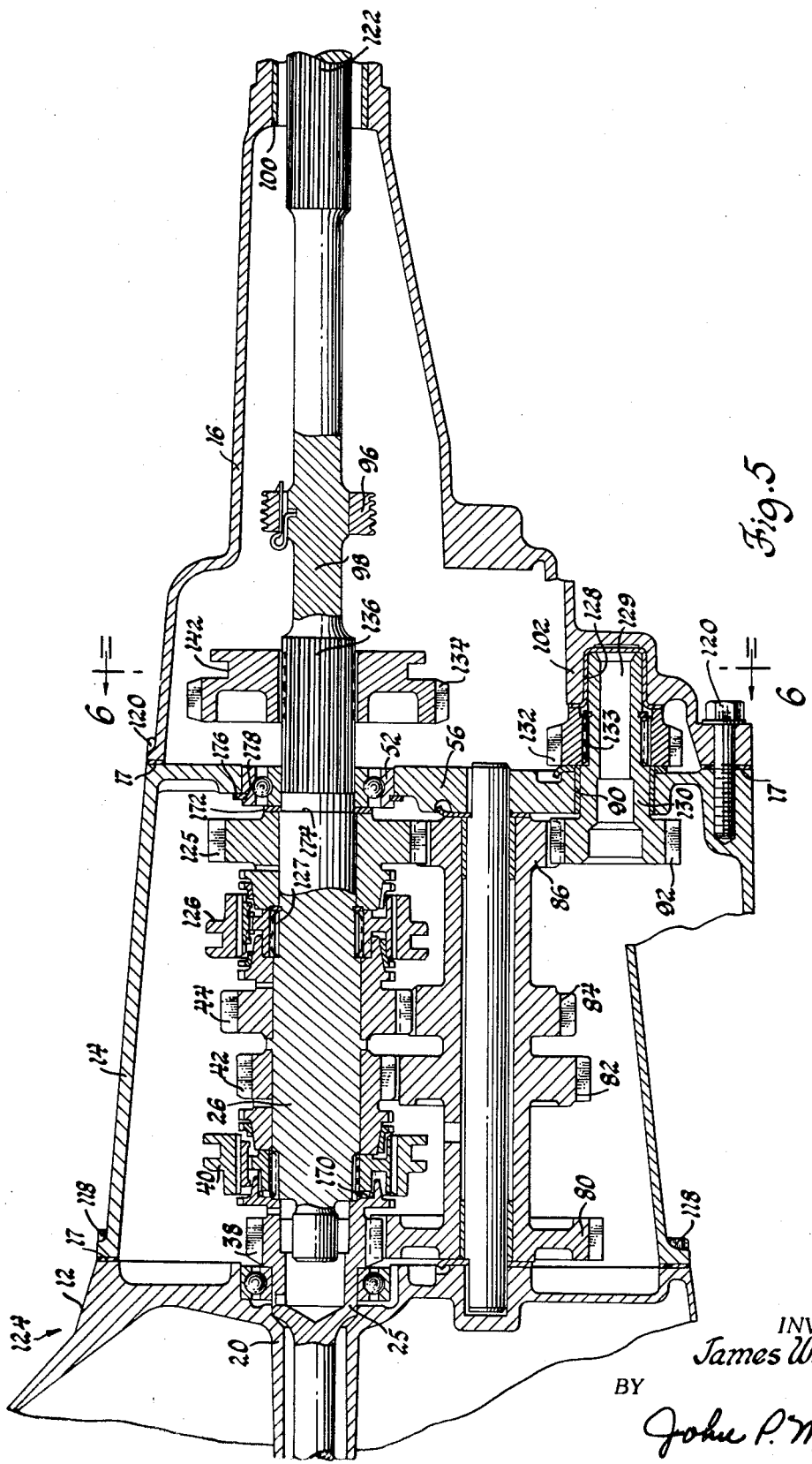
FIG. 5 is a fragmentary cross-sectional view of a four-speed transmission embodying the invention.

Referring now to FIG. 5, it may be noted that the four-speed transmission assembly 124 utilizes the same clutch housing 12, transmission case 14, and extension housing 16, as described above for the three-speed transmission. The gear 48 and the hub 50 of FIG. 1 are replaced by a first speed ratio output gear 125 and the first-second synchronizing device 126 is driven directly by the mainshaft portion 26 by means of splines 127. It is merely necessary to form an opening 128, as by drilling, in the boss 102 for the insertion of the end 129 of a now longer reverse idler shaft 130 which extends through the opening 90 formed in the rear wall 56 of the transmission case 14. An additional reverse idler gear 132 is mounted on splines 133 formed on the shaft 130.

Figure 6:
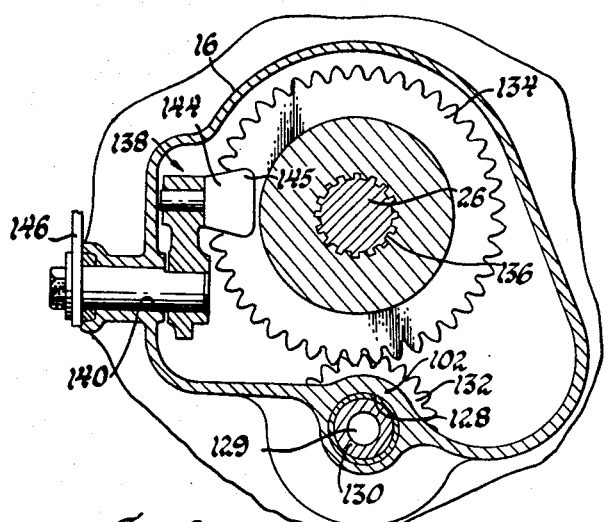
FIG. 6 is a cross-sectional view taken along the plane of line 6—6 of FIG. 5, and looking in the direction of the arrows.

A reverse output gear 134 is mounted on splines 136 formed on the extension 98 of the rear portion 26 of the mainshaft 24 prior to step (C) described above, i.e., prior to the mounting of the speedometer drive gear 96. The reverse output gear 134 is slidably moved along the splines 136 to mesh with the reverse idler gear 132 by means of a reverse shift mechanism 138 (FIG. 6). The latter is mounted through an opening 140 formed in the extension housing 16 for cooperation with a synchronizer groove 142 (FIG. 5) formed adjacent the reverse output gear 134.

The assembly of the extension housing 16, when applied to the four-speed transmission, requires, in the process of step (D) above, moving the reverse shift fork 144 (FIG. 6) of the reverse shift mechanism 138 to a forward attitude which permits the innermost edge 145 thereof to fit in the synchronizer groove 142. The reverse shift fork 144 is then manually returned to a neutral position by a lever 146 prior to the extension housing 16 and the rear gasket 17 being abutted against the rear wall 56 of the transmission case 14 and secured thereto by the bolts 120. Once assembled, when the lever 146 is rotated so as to move the shift fork 144 forward, the reverse output gear 134 engages the reverse idler gear 132 for "REVERSE" drive.

The output gears 125, 44 and 42 in the transmission case 14 now become first, second and third ratio output gears, respectively, these gears (gear 125 in lieu of gear 48 of FIG. 1) having been reverse, first and second ratio output gears, respectively, in the three-speed transmission.

FIVE-SPEED TRANSMISSION

Figure 9:
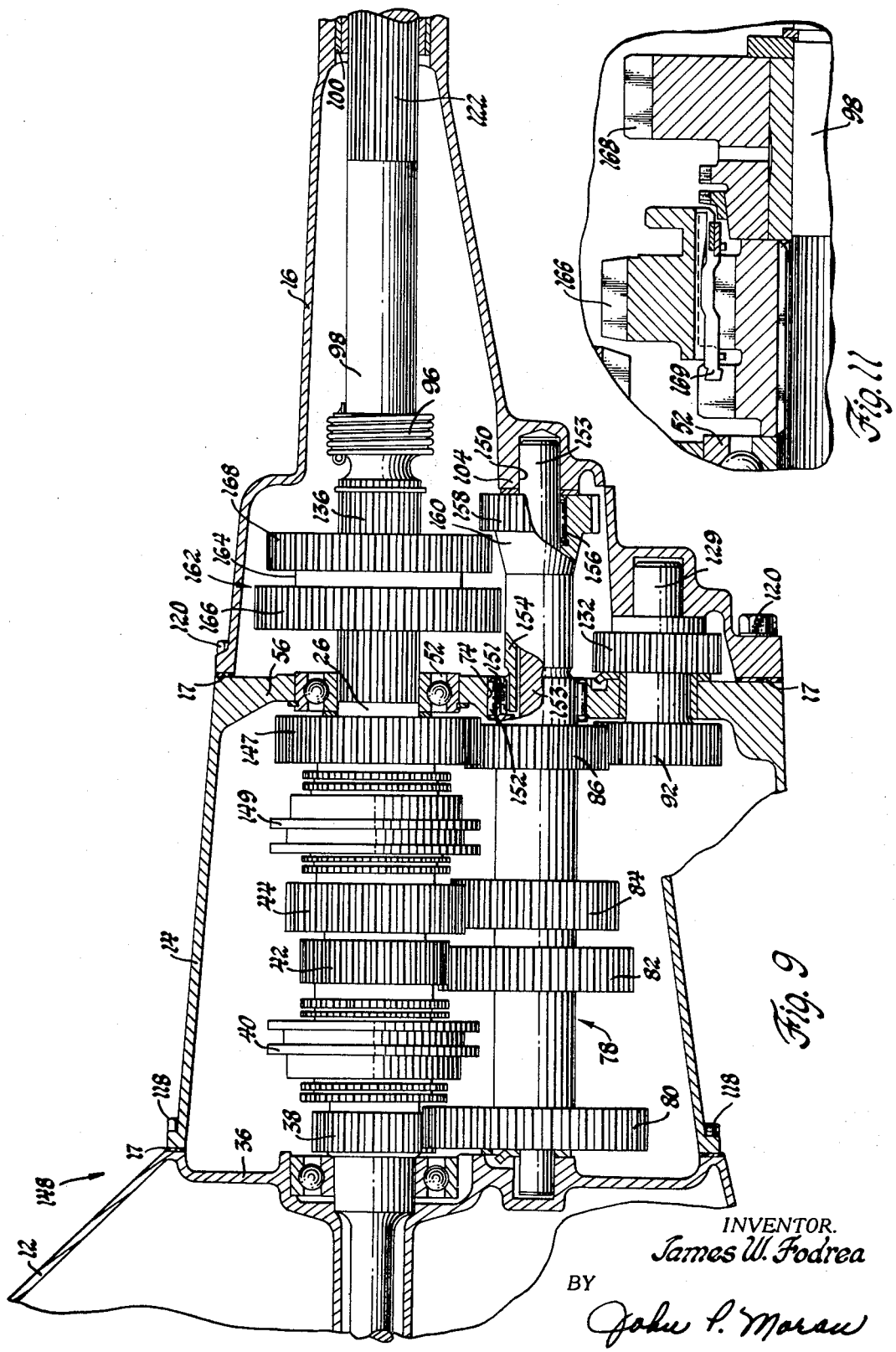

Referring now to FIG. 9, it may be noted that the gear 48 and the hub 50 of FIG. 1 are replaced by a second speed ratio output gear 147 in the five-speed transmission assembly 148, and the second-third synchronizing device 149 is driven directly by the mainshaft portion 26 through the splines 127.

To adapt the transmission case 14 and the extension housing 16 for use with the five-speed transmission, it is merely necessary to form a pocket or opening 150, as by drilling, in the boss 104 of the extension housing 16 and to enlarge the opening 74 formed in the rear wall 56 of the transmission case 14. The gear cluster 78 is formed, for use in the five-speed transmission, to include an internally splined extension 151 rotatably mounted on needle bearings 152 in the enlarged opening 74, and a longer countershaft 153 extends through the opening 74 and into the pocket 150. This permits the addition of an externally splined extension shaft 154 on the internally splined extended end 151 of the gear cluster 78 around the longer countershaft 153. The extension shaft 154 is supported on the extended portion of the countershaft 153 adjacent the drilled opening 150 by needle bearings 156, and includes a new first speed ratio input gear 158 formed on the rear end 160 thereof.

In lieu of the reverse output gear 134 of FIG. 5, a nonsynchronized reverse output and first ratio output duplex gear 162 is mounted on the splines 136 formed on the extension 98 of the mainshaft 24. The shift mechanism 138 (FIG. 6), which now provides for shifting into either "REVERSE" or "FIRST", is mounted in the same manner in the groove 164 formed between the reverse output gear portion 166 and the first ratio output gear portion 168, as was described above relative to the four-speed transmission shifter groove 142. Once assembled, when the lever 146 (FIG. 6) is rotated so as to move the shift fork 144 forward, the reverse output gear portion 166 of the duplex gear 162 engages the reverse idler gear 132 for "REVERSE" drive, and when rotated so as to move the shift fork 144 rearward, the first ratio output gear portion 168 of the duplex gear 162 engages the input gear 158 for the lowest or first ratio "FORWARD" drive.

FIG. 11 illustrates the fully synchronized first ratio output version of the five-speed transmission with a synchronizer plate 169 associated with the first ratio output gear 168 in the usual manner.

The output gears 147, 44 and 42 in the transmission case 14 become second, third and fourth ratio output gears, respectively, these gears (gear 147 in lieu of gear 48 of FIG. 1) having been first, second and third ratio output gears, respectively, in the four-speed transmission and reverse, first and second ratio output gears, respectively, in the three-speed transmission.

Referring now to FIG. 5, and applicable to FIG. 9 also, it may be noted that: (1) a thrust bearing 170 is mounted around the mainshaft rear portion 26 adjacent the forward end of the front synchronizing device 40; (2) a retainer ring 172 is mounted adjacent a small shoulder 174 formed on the shaft 26 between the bearings 52 and the adjacent gear faces; and (3) a retainer ring 176 is mounted in a groove 178 on the bearings 52 adjacent the inside face of the rear wall 56 of the transmission case 14. The thrust bearing 170 and the rings 172 and 176 eliminate the need for the retainer rings 54, 55 and 57 of FIG. 2 secured respectively to the mainshaft rear portion 26, the transmission case 14 and the mainshaft rear portion 26. The bearing 170 serves to absorb any forward thrust of the mainshaft rear portion 26. The bearing 170 and the rings 172 and 176 may be substituted in the FIGS. 1 and 2 structures in place of the prior art retainer rings 54, 55 and 57 shown therein.

As has been described above, the clutch housing 12, the transmission housing 14 and the extension housing 16 are formed by a die casting process, with each housing including an open front portion and an integrally cast rear wall. The rear wall of the clutch housing 12 and the rear wall of the transmission housing 14 serve as the forward walls of the transmission housing 14 and the extension housing 16, respectively. As was indicated above relative to FIGS. 6 and 7, the side cover assembly 106, including a pair of shift fork mechanisms, is mounted on the housing 14, and a single shift mechanism 138 is mounted on the extension housing 16, for actuating various synchronizing devices within the transmission. This, of course, requires that there be openings and various other exterior configurations formed on the housings 14 and 16. Such openings and exterior configurations are possible in the die casting process by utilizing a die having a slidably movable side portion, including forward extending protrusions which serve to form the required openings through the walls of the housings. Die protrusions may also be required adjacent the shift mechanism windows or openings to blend the frame-like flanges therearound with the exterior transmission body. When slid into place, the die protrusions not only form the windows or openings, but are abutted against the side of the usual metal core, thereby permitting the outer surface of the core to be flush with the generally circular housing interior for ready withdrawal after the pouring process is complete. The slidable die portion is then retracted to permit the withdrawal of the housing casting. Hence, projections or recesses on the housing 14 or 16 exteriors, or openings or windows therein, need not interfere with the above-described die casting approach to forming a readily usable and very versatile clutch and transmission casing.

THE FIG. 10 MODIFICATION

Figure 10:
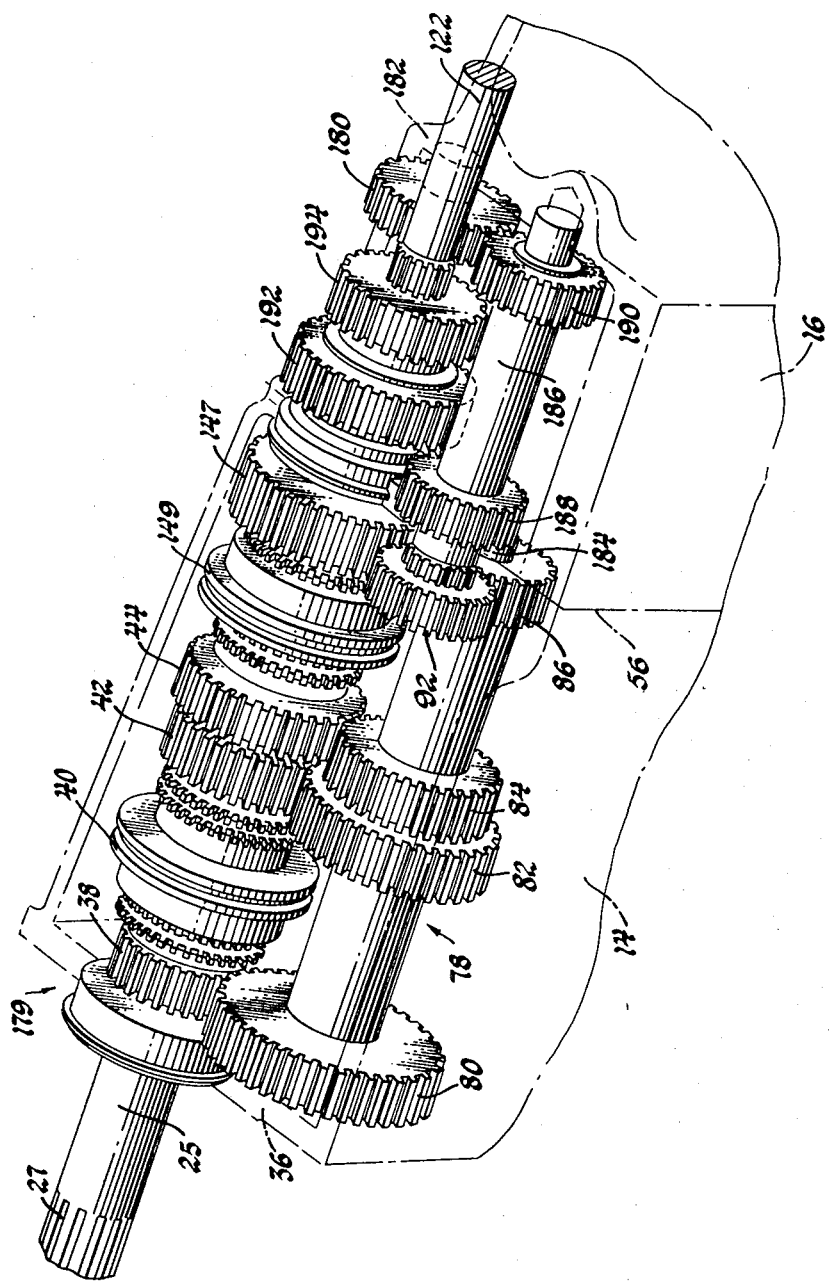
FIG. 10 is a fragmentary cross-sectional view of a modification of FIG. 9.

The FIG. 10 five-speed structure 179 differs from that of FIG. 9 in that: (1) an additional first speed ratio idler gear 180 is individually rotatably mounted on a rear wall 182 of the extension housing 16; (2) the countershaft 184 terminates at the rear wall 56 of the transmission case 14, rather than extending therethrough into the extension housing 16; and (3) the reverse idler shaft 186 includes a reverse idler gear 188 and a first speed ratio idler gear 190. In operation, the rear countershaft gear 86 drives the reverse idler gear 92 in the transmission case 14, and the first speed ratio idler gear 190 in the extension housing 16 drives the individually mounted first speed ratio idler gear 180.

The reverse output and first speed ratio output duplex gears 192 and 194 are shown in "NEUTRAL". When moved forward, the reverse output gear 192 engages the reverse idler gear 188 for "REVERSE" drive, and when moved rearward, the output gear 194 engages the first speed ratio idler gear 180 for the lowest or first ratio "FORWARD" drive.

It should be apparent that the invention provides a novel transmission arrangement which is readily convertible for use with improved three-, four-, or five-speed sliding gear transmission assemblies, any one of which may be readily assembled directly on the motor vehicle, eliminating the need for separate transmission assembly facilities.

While various embodiments of the invention have been shown and described, it is apparent that other modifications thereof are possible.

I claim:

1. A method of manufacturing a drive train, including: forming an input shaft with an input gear mounted thereon, a bearing, an output shaft including a front pilot bearing having a pilot taper for axially aligning with said input shaft, output gearing and clutching mechanism for selectively connecting each output gear to the output shaft and an input gear to the output shaft, and assembling the output gearing and clutching mechanism on the output shaft in operative position to selectively clutch each output gear and the input gear to the output shaft to selectively establish a plurality of ratio drives, and the bearing being fixed on the rear portion of the output shaft; forming a countershaft having a support portion with a pilot taper at each end and a countershaft cluster gear having an input gear and a plurality of ratio gears and each having bearing means, and assembling the cluster gear with the bearing means rotatably supporting the cluster gear on the countershaft; forming an idler gear on an idler shaft; casting a cup-shaped clutch housing having a smooth draftable interior cup-shaped surface and a cup-shaped external surface generally smooth except for a draftable securing flange at the lip of the cup-shaped housing and forming in the bottom end wall of the cup-shaped clutch housing an input shaft aperture and a countershaft aperture; and positioning the output shaft in the gear assembly, positioning said cluster gear and countershaft adjacent said gear assembly with said ratio gears of said cluster gear in mesh with said output gears, positioning one end of each of said countershaft and said input shaft into said countershaft aperture and said input shaft aperture, respectively, of said cup-shaped clutch housing, casting a cup-shaped transmission housing having a smooth draftable interior cup-shaped surface and a cup-shaped external surface generally smooth except for a draftable securing flange at the lip of the cup-shaped transmission housing and an annular flange around an opening for the control linkage entry and forming in the bottom end wall of the cup-shaped transmission housing an output shaft aperture, an idler shaft aperture and a countershaft aperture; positioning said idler gear and idler shaft assembly with said idler shaft mounted in said idler shaft aperture of said transmission housing for mesh with a countershaft gear; placing said transmission housing over said assembled output gears, countershaft cluster gear and input gear and against said end wall of said clutch housing, meshing said idler gear with a countershaft gear, and securing and sealing said securing flange to said end wall of said clutch housing.

2. The invention defined in claim 1, and forming a pair of thrust washers having means cooperating with means on said countershaft and housings to prevent rotation of said countershaft and assembling and fixing said thrust washers on said countershaft at each end of said cluster gear to axially locate said cluster gear before pressing said countershaft into said countershaft aperture in said clutch housing.

3. A method of manufacturing a multispeed ratio transmission casing, suitable for variable speed ratios, the method including the following steps:
   a. forming a clutch housing, a transmission case, and an extension housing by die casting, said clutch housing serving as the forward wall of the transmission case and having first and second openings formed therein for mounting one end of each of a main shaft and countershaft, said transmission case serving as the front wall of the extension housing and having first and second openings formed therein and aligned with said first and second openings, respectively, in said clutch housing for mounting the other end of each of the mainshaft and countershaft, and a third opening formed therein for mounting a reverse idler gear, and said extension housing having first and second bosses formed on an inner surface thereof; and
   b. forming an opening in the first boss axially aligned with said transmission case third opening, said formed opening and said third opening serving as means for mounting a reverse idler and input gear shaft therein.

4. A method of manufacturing a multispeed ratio transmission casing, suitable for variable speed ratios, the method including the following steps:
   a. forming a clutch housing, a transmission case, and an extension housing by die casting, said clutch housing serving as the forward wall of the transmission case and having first and second openings formed therein for mounting one of each of a mainshaft and countershaft, said transmission case serving as the front wall of the extension housing and having first and second openings formed therein aligned with said first and second openings, respectively, in said clutch housing for mounting the other end of each of the mainshaft and countershaft, and a third opening formed therein for mounting a reverse idler gear, and said extension housing having first and second bosses formed on an inner surface thereof;

b. forming an opening in the first boss axially aligned with said transmission case third opening, said formed opening and said third opening serving as means for mounting a reverse idler and input gear shaft therein;

c. forming an opening in the second boss axially aligned with said clutch housing and transmission case second openings suitable for mounting one end of an extension shaft therein; and d. forming said second opening in the transmission case larger, suitable for mounting bearings therein to support an end of the countershaft to which the other end of the extension shaft is splined.

5. A method of assembling a four-speed transmission on a motor vehicle, the method including the following steps:

a. mounting the mainshaft assembly including input gear, first, second and third ratio output gears and countershaft assembly including drive gear, first, second and third ratio input gears on the rear wall of the clutch housing, said mainshaft of said assembly extending through an opening therein into the clutch housing;

b. mounting the transmission case on the mainshaft and countershaft, the mainshaft extending through an opening formed in the rear wall of the transmission case;

c. mounting the reverse output gear on the extension of the mainshaft;

d. mounting the speedometer drive gear on the extension of the mainshaft;

e. mounting the extension housing including a shifter fork on the mainshaft and against the rear wall of the transmission housing; and f. mounting the side cover assembly including first-second and third-fourth shifter forks on the transmission housing.

6. A method of assembling a five-speed transmission on a motor vehicle, the method including the following steps:

a. mounting the mainshaft assembly including input gear, second, third and fourth ratio output gears and countershaft assembly including drive gear, second, third and fourth ratio input gears on the rear wall of the clutch housing, said mainshaft of said assembly extending through an opening therein into the clutch housing;

b. mounting the transmission case on the mainshaft and countershaft, the mainshaft and countershaft extending beyond the transmission case rear wall;

c. mounting the reverse output and first ratio output gears on the extension of the mainshaft;

d. mounting the speedometer drive gear on the extension of the mainshaft;

e. mounting the first ratio input gear on the extension of the countershaft;

f. mounting the extension housing including a shifter fork on the mainshaft and against the rear wall of the transmission housing; and g. mounting the side cover assembly including second-third and fourth-fifth shifter forks on the transmission housing.

* * * * *